(12) United States Patent
Ishino

(10) Patent No.: US 9,967,431 B2
(45) Date of Patent: May 8, 2018

(54) INFORMATION PROCESSING APPARATUS FOR ISSUING TEMPORARY IDENTIFICATION INFORMATION TO USER AND FOR OBTAINING AUTHORIZATION INFORMATION FROM SERVICE PROVIDING APPARATUS

(71) Applicant: FUJI XEROX CO., LTD., Tokyo (JP)

(72) Inventor: Shigeki Ishino, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/225,076

(22) Filed: Aug. 1, 2016

(65) Prior Publication Data

US 2017/0244864 A1 Aug. 24, 2017

(30) Foreign Application Priority Data

Feb. 22, 2016 (JP) .................. 2016-030768

(51) Int. Cl.
| | | |
|---|---|---|
| *G06F 3/12* | (2006.01) | |
| *H04N 1/44* | (2006.01) | |
| *G06F 21/60* | (2013.01) | |

(52) U.S. Cl.
CPC ......... *H04N 1/4413* (2013.01); *G06F 3/1222* (2013.01); *G06F 3/1238* (2013.01); *G06F 3/1288* (2013.01); *G06F 3/1292* (2013.01); *G06F 21/608* (2013.01); *H04N 1/4433* (2013.01); *H04N 2201/0094* (2013.01)

(58) Field of Classification Search
CPC ... G06F 3/1238; G06F 3/1222; H04N 1/4413; H04N 1/4433
See application file for complete search history.

(56) References Cited

U.S. PATENT DOCUMENTS

| | | | |
|---|---|---|---|
| 9,137,131 B1* | 9/2015 | Sarukkai ............. | H04L 43/0876 |
| 2014/0007199 A1 | 1/2014 | Ishino | |
| 2014/0289408 A1* | 9/2014 | Ishino ..................... | H04L 63/10 709/225 |

(Continued)

FOREIGN PATENT DOCUMENTS

| | | |
|---|---|---|
| JP | 2014-010769 A | 1/2014 |
| JP | 2014-186655 A | 10/2014 |

*Primary Examiner* — Benjamin O Dulaney

(74) *Attorney, Agent, or Firm* — Oliff PLC

(57) ABSTRACT

A non-transitory computer readable medium stores a program causing a computer to execute a process. The process includes receiving a temporary use request from a user; generating temporary identification information in accordance with the temporary use request and providing the generated temporary identification information to the user; acquiring authorization information from a service providing apparatus, the authorization information being information for receiving delegation of a privilege of the user for the service providing apparatus; storing the temporary identification information and the authorization information in association with each other; and when a request including the temporary identification information is received from an apparatus that has transmitted the request, transmitting the authorization information to the service providing apparatus in order to perform an operation according to the request, the authorization information being associated with the temporary identification information.

6 Claims, 5 Drawing Sheets

(56) References Cited

U.S. PATENT DOCUMENTS

| | | | |
|---|---|---|---|
| 2015/0015908 A1* | 1/2015 | Tanaka | G06K 15/4095 358/1.14 |
| 2016/0255245 A1* | 9/2016 | Ishibashi | H04N 1/4433 358/1.14 |
| 2017/0078502 A1* | 3/2017 | Subana | H04N 1/00344 |

* cited by examiner

FIG. 4

| TEMPORARY ID | ACCESS TOKEN | CLOUD SERVICE | EXPIRATION DATE |
|---|---|---|---|
| 1234abc | ABCD5432.... | SERVICE A | 3/5 13:05 |
| 2345cde | 135FGHI24.... | SERVICE B | 3/5 13:06 |
| ......... | ............... | ............ | ............ |

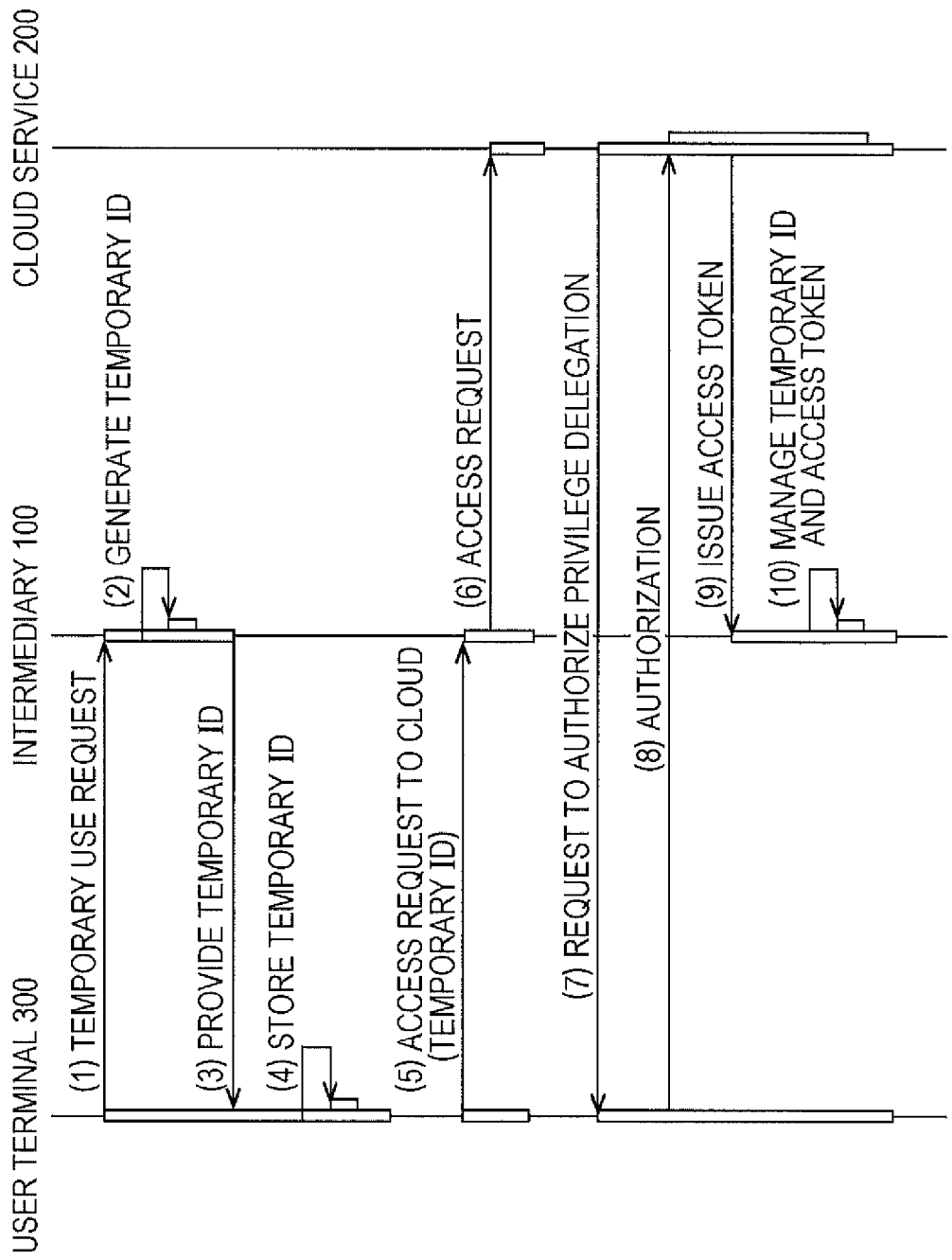

INFORMATION PROCESSING APPARATUS FOR ISSUING TEMPORARY IDENTIFICATION INFORMATION TO USER AND FOR OBTAINING AUTHORIZATION INFORMATION FROM SERVICE PROVIDING APPARATUS

CROSS-REFERENCE TO RELATED APPLICATIONS

This application is based on and claims priority under 35 USC 119 from Japanese Patent Application No. 2016-030768 filed Feb. 22, 2016.

BACKGROUND

Technical Field

The present invention relates to a non-transitory computer readable medium, an information processing apparatus, and an information processing method.

SUMMARY

According to an aspect of the invention, there is provided a non-transitory computer readable medium storing a program causing a computer to execute a process. The process includes receiving a temporary use request from a user; generating temporary identification information in accordance with the temporary use request and providing the generated temporary identification information to the user; acquiring authorization information from a service providing apparatus, the authorization information being information for receiving delegation of a privilege of the user for the service providing apparatus; storing the temporary identification information and the authorization information in association with each other; and when a request including the temporary identification information is received from an apparatus that has transmitted the request, transmitting the authorization information to the service providing apparatus in order to perform an operation according to the request, the authorization information being associated with the temporary identification information.

BRIEF DESCRIPTION OF THE DRAWINGS

Exemplary embodiments of the present invention will be described in detail based on the following figures, wherein:

FIG. 4 is a diagram illustrating exemplary data in a database that is used to manage temporary IDs and that is held in the intermediary; and FIG. 5 is a diagram illustrating an example in which a temporary ID is provided at a different timing and which is illustrated as a part of an exemplary process flow of using the intermediary temporarily.

DETAILED DESCRIPTION

Figure 1:
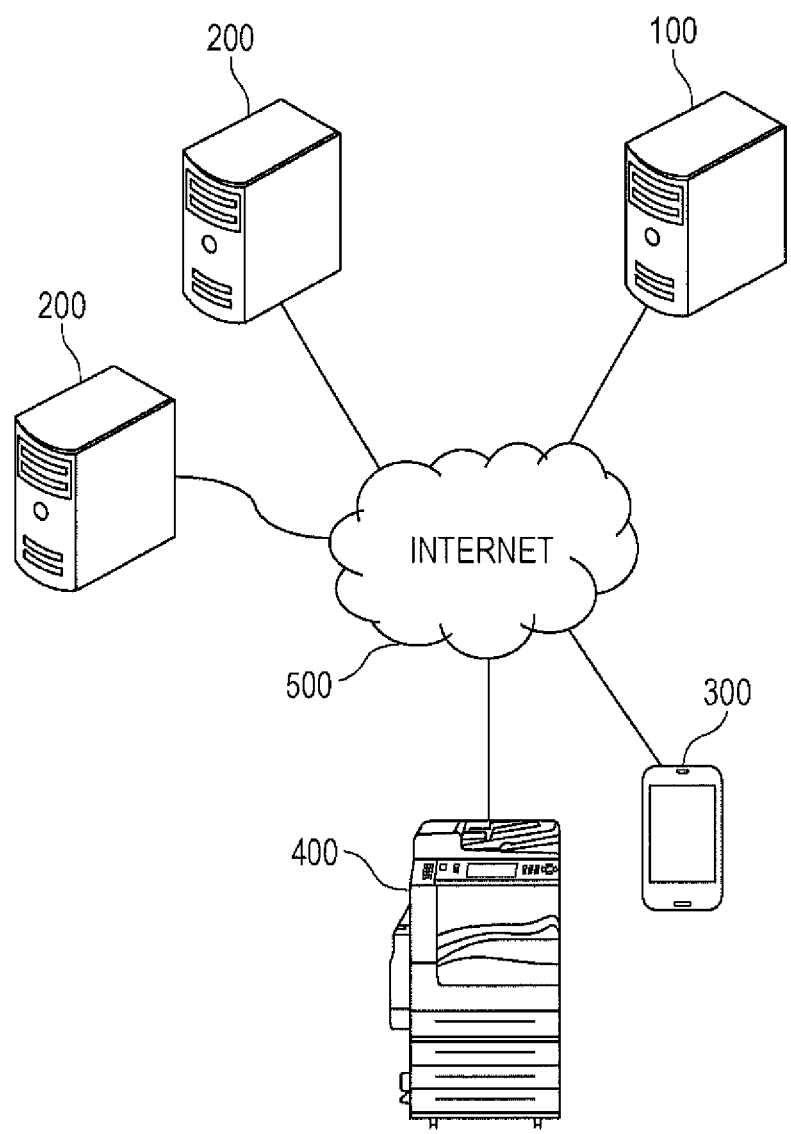
FIG. 1 is a diagram illustrating an exemplary system configuration according to an exemplary embodiment.

Referring to FIG. 1, an exemplary system configuration according to an exemplary embodiment will be described.

The exemplary system includes an intermediary 100, one or more cloud services 200, a user terminal 300, and a multi-function device 400 which are capable of communicating with one another via the Internet 500.

Each of the cloud services 200 is a system which provides a service to users through cloud computing on a network such as the Internet 500. On the Internet 500, various cloud services 200 which provide various services to users are present. Examples of the cloud services 200 include Google™ Docs which provides a document management service, Google Cloud Print which provides a print service, and Facebook™ and Twitter™ which provide social networking services (SNSs).

The intermediary 100 is a system which plays an intermediary role between users and one or more cloud services 200. Similarly to an intermediary described in Japanese Unexamined Patent Application Publication No. 2014-10769, the intermediary 100 may relay requests and responses which are transmitted between various cloud services 200 and various user devices (such as the user terminal 300 and the multi-function device 400), and the various cloud services 200 may include cloud services that understand different commands or use different protocols. From the viewpoint of a user, the intermediary 100 functions as a one-stop contact point for various cloud services 200.

The user terminal 300 is an information processing terminal, such as a personal computer or a smartphone, which is operated by a user. Programs such as a Web browser is installed in the user terminal 300.

The multi-function device 400 is another exemplary apparatus operated by a user. The multi-function device 400 which is a multi-function apparatus provided with multiple functions, such as those of a printer, a scanner, a copier, a facsimile, and the like, transmits an image obtained through scanning to a cloud service 200 via the Internet 500, and receives print data supplied from a cloud service 200 and prints the data. The multi-function device 400 is merely an example, and the cloud services 200 may be used from another type of service equipment such as a kiosk terminal.

A user may use a cloud service 200 having his/her account, via the intermediary 100. For example, a user having a Google account may use his/her account to use various cloud services provided by Google Inc., such as Google Docs and Google Cloud Print. The user may have an account in the intermediary 100. An account in the intermediary 100 and an account in a cloud service 200 are different from each other.

When a user is to create an account in the intermediary 100, the user needs to perform some operations, for example, registration of user information such as an electronic mail address and authentication information such as a password, in the intermediary 100. For example, when a user temporarily uses the intermediary 100, such registration operations may be irksome to the user. Therefore, in the exemplary embodiment, a mechanism is provided in which, without user registration in the intermediary 100, a user may use a cloud service 200 via the intermediary 100.

To achieve this, in the exemplary embodiment, the intermediary 100 issues temporary user identification information (which is called a "temporary ID") to a user who has requested use of a cloud service 200. The intermediary 100 manages the temporary ID and access authorization information (which is called an access token) for a cloud service 200 which is provided by the user to the intermediary 100 according to an authorization protocol such as OAuth, in such a manner that the temporary ID and the access authorization information are associated with each other. The intermediary 100 uses the temporary ID and the access token to play an intermediary role between the user and the cloud service 200. OAuth which is described as an example is a protocol for providing, for a desktop computer, a portable terminal, a Web application, or the like, standard functions for secure application programming interface (API) authorization.

Figure 2:
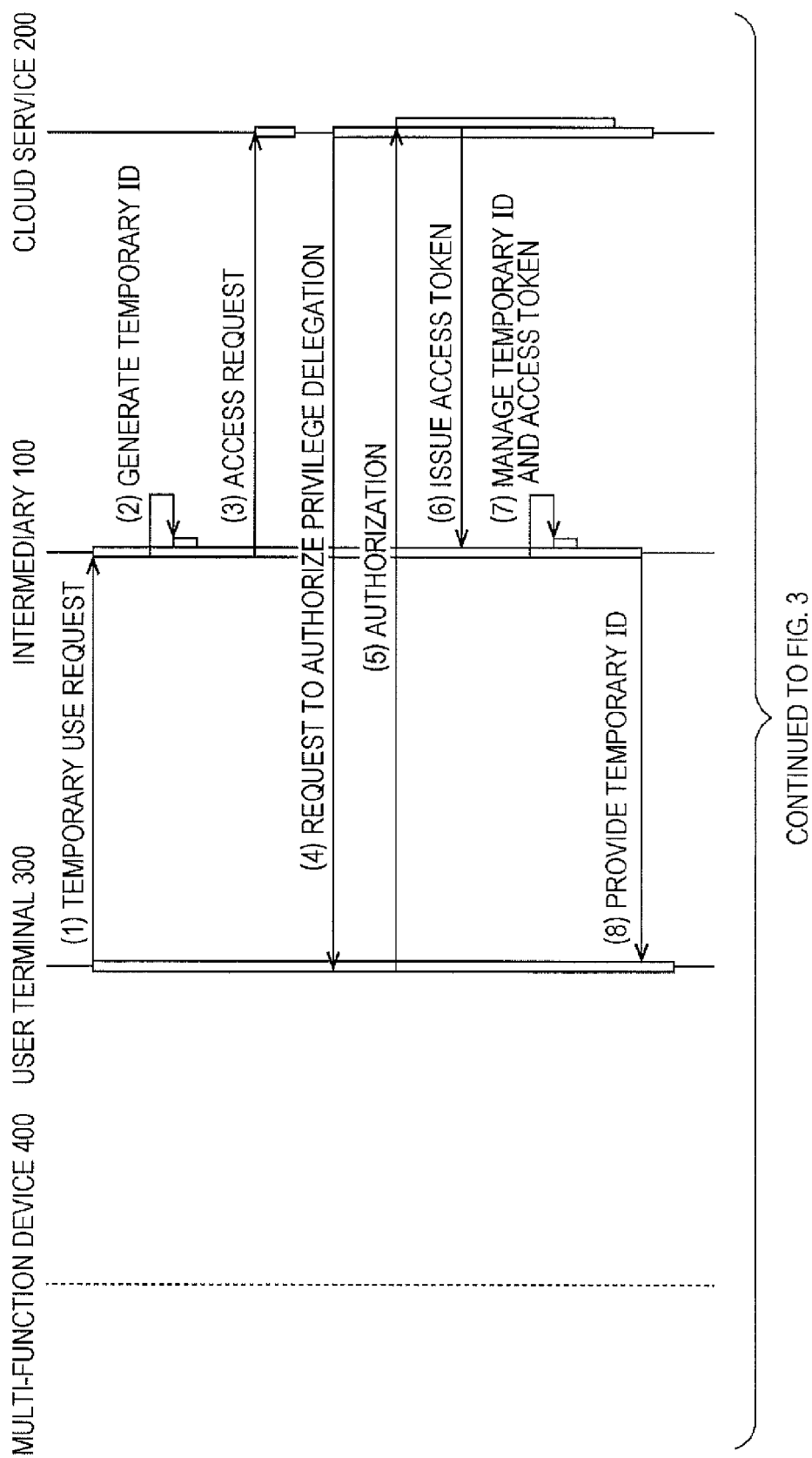
FIG. 2 is a diagram illustrating a part of an exemplary process flow of using an intermediary temporarily, according to the exemplary embodiment.
Figure 3:
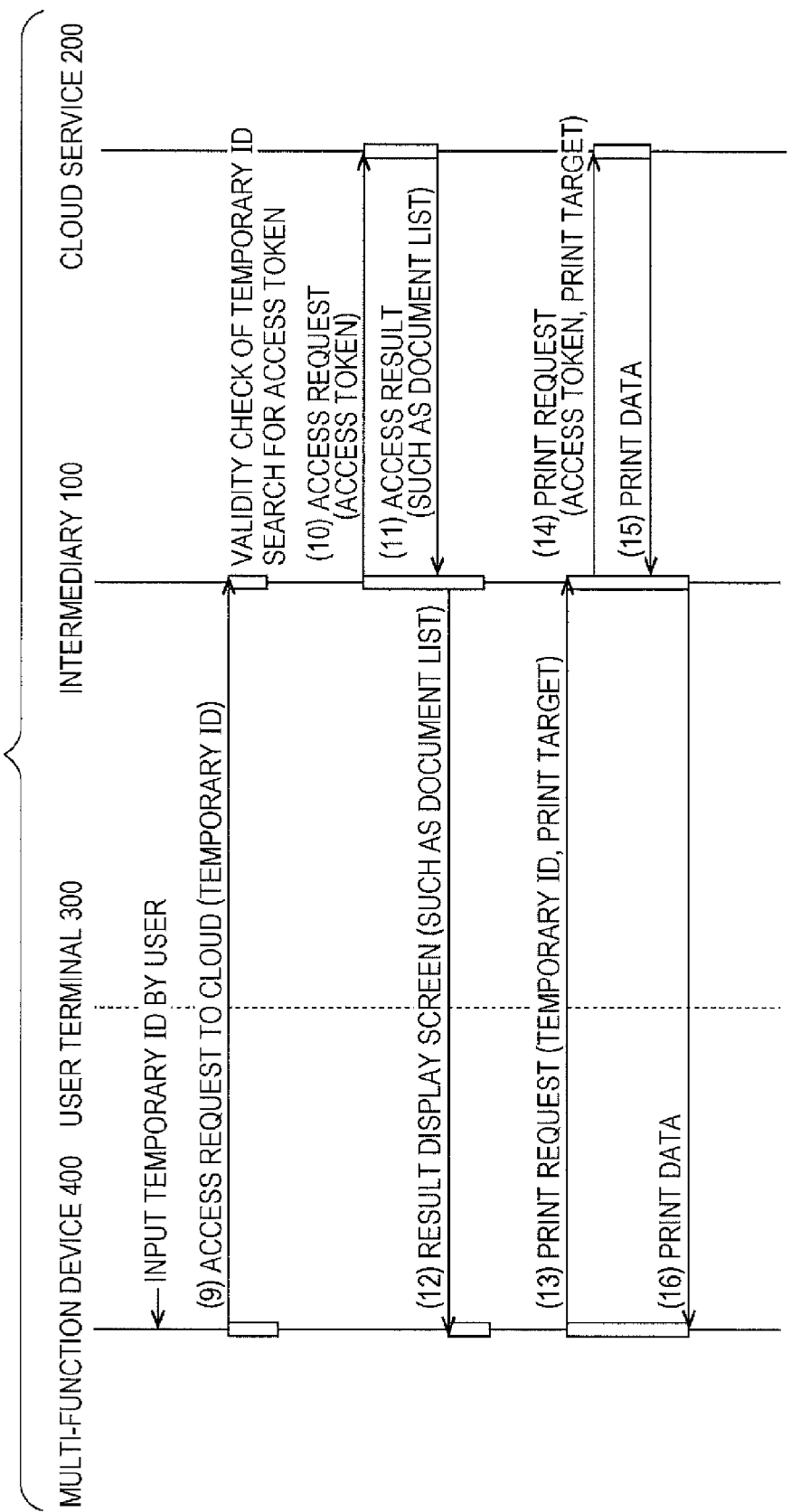
FIG. 3 is a diagram illustrating the remaining part of the process flow of using the intermediary temporarily, according to the exemplary embodiment.

Referring to FIGS. 2 and 3, an exemplary process flow according to the exemplary embodiment will be described. This is merely an example, and, in this example, assume that a cloud service 200 provides a service for storing document data transmitted from a user, and a service for converting stored document data to print data and transmitting the print data to a specified print apparatus for printing.

In (1), when a user wants to use a cloud service 200 via the intermediary 100 without user registration in the intermediary 100, the user transmits a temporary use request from the user terminal 300 to the intermediary 100. For example, an exemplary case is such that the user wants to use a service (for example, printing of a document owned by the user in the cloud service 200) in collaboration with a cloud service 200 by using the multi-function device 400 managed by the intermediary 100 and that the user has not performed user registration in the intermediary 100 and wants to avoid user registration because the user does not plan further use of the intermediary 100 in the future. The temporary use request may be made, for example, in an operation in which the intermediary 100 is accessed through an application such as a Web browser installed in the user terminal 300 and in which a button for transmitting an instruction for temporary use is selected on a portal Web page provided by the intermediary 100. The portal Web page may be a dedicated page for transmitting an instruction for temporary use, or may be a page which is used to log in the intermediary 100 and on which a graphical user interface (GUI) button for transmitting an instruction for temporary use is provided.

Upon reception of a temporary use request, the intermediary 100 receives, from the user, selection of a cloud service 200 that is to be used this time. The selection may be received before reception of a temporary use request, after reception of a temporary use request, or at the same time (for example, the selection is performed on the portal Web page for transmitting a temporary use request).

In (2), the intermediary 100 which has received the temporary use request generates a temporary ID that is to be assigned to the user who has transmitted the request. The intermediary 100 assures uniqueness of the generated temporary ID until a predetermined expiration date. After that, before the expiration date, the intermediary 100 identifies the user by using the temporary ID. The user uses the temporary ID until the expiration date, whereby the user may use not only the cloud service 200 selected in (1) described above but also another cloud service 200 via the intermediary 100. However, this is merely an example, and a cloud service 200 which may be used by using the temporary ID may be limited to the cloud service 200 selected by the user in (1) described above.

In (3), the intermediary 100 performs a process for obtaining access authorization information (access token) for authorizing access to information that is related to the user (for example, a document registered by the user or the private information) and that is stored on the cloud service 200 selected by the user in (1) described above. The access token is obtained, for example, by using OAuth (until (6) described below). In this case, for example, the intermediary 100 transmits an access request to the cloud service 200 selected by the user, receives/transmits information from/to the cloud service 200 in accordance with OAuth, and redirects the user to a Web page which is used to transmit an instruction to give access authorization and which is provided by the cloud service 200.

In (4), through the redirection, the cloud service 200 provides, to the user through the user terminal 300, a Web page for transmitting an instruction to give access authorization. The Web page is used to enquire, to the user, whether or not the intermediary 100 is to be authorized to access information that is related to the user and that is stored on the cloud service 200 (in other words, the user privilege to the cloud service 200 which is owned by the user, particularly, a privilege necessary to use the service selected by the user this time, is delegated to the intermediary 100).

In (5), when the user transmits an instruction to authorize the access, on the page for transmitting an instruction to give access authorization, an instruction to give authorization (permission to delegate a privilege to the intermediary 100) is transmitted from the user terminal 300 to the cloud service 200.

In (6), the cloud service 200 which has received the instruction to give authorization from the user terminal 300 issues an access token corresponding to the authorization, to the intermediary 100 which has transmitted the access request (in (3) described above) according to OAuth. The cloud service 200 stores the issued access token in association with the account of the user.

In (7), the intermediary 100 receives the access token issued by the cloud service 200, and stores the access token in association with the temporary ID generated in (2) described above, in a temporary-ID management database (DB) (not illustrated). FIG. 4 illustrates exemplary data in the management DB. In the example in FIG. 4, in the management DB, an access token which is obtained from the cloud service 200 on the basis of the user authorization, identification information (for example, a uniform resource locator (URL)) of the cloud service 200 which has issued the access token, and an expiration date for the access token are registered in association with the temporary ID. The expiration date is, for example, a date and time obtained by adding a predetermined term of validity to the date and time at which the access token is obtained from the cloud service 200.

In (8), the intermediary 100 returns, to the user terminal 300, the temporary ID as a response to the temporary use request having been transmitted in (1) described above. For example, the intermediary 100 returns a Web page on which a string representing the temporary ID is displayed, to the user terminal 300. The user terminal 300, for example, displays the received temporary ID on a screen and/or stores the received temporary ID.

Referring to FIG. 3, a flow in which the user uses the obtained temporary ID to use a service from the cloud service 200 will be described.

The user goes to the multi-function device 400 with a memo on which the temporary ID displayed on the user terminal 300 is written (when the user terminal 300 is not a mobile terminal) or with the user terminal on which the temporary ID is displayed on a screen. The user inputs the temporary ID to the multi-function device 400, and transmits an instruction to use the cloud service. For example, when a menu item "Use the cloud service with a temporary ID" is selected on an operation menu screen of the multi-function device 400, the multi-function device 400 displays a screen for inputting a temporary ID, and the user inputs the temporary ID on the screen.

In (9), the multi-function device 400 transmits, to the intermediary 100, an access request including the temporary ID which has been input by the user. The intermediary 100 checks validity of the received temporary ID. For example, the intermediary 100 determines that the received temporary ID is valid if the temporary ID is present in the temporary-ID management DB.

In (10), if the temporary ID received with the access request is valid, the intermediary 100 reads the access token corresponding to the temporary ID and the identification information of the cloud service from the temporary-ID management DB. The intermediary 100 transmits an access request including the access token which has been read, to the cloud service 200 corresponding to the identification information which has been read.

In (11), the cloud service 200 specifies the account of the user corresponding to the access token included in the access request having been transmitted from the intermediary 100, obtains a list of documents stored in association with the user account in the cloud service 200, and returns information about the obtained document list to the intermediary 100.

In (12), the intermediary 100 returns the received information about a document list (or display information of a Web page or the like which is generated by processing the document list information) to the multi-function device 400 which has transmitted the access request. The multi-function device 400 displays the received document list information on a screen. The user performs an operation, such as an operation of selecting, on the document list screen, a document that is to be printed and transmitting a print instruction or an operation of setting, on an automatic document feeder, a paper document that is to be added to the document list and transmitting a scan instruction. In FIG. 3, a process flow used when the user transmits a print instruction will be described as a typical example.

In (13), in this case, the multi-function device 400 transmits, to the intermediary 100, a print request which includes the temporary ID having been input between (8) and (9) described above, and which also includes identification information of a document that is to be printed and that is selected on the document list screen.

In (14), if the print request includes a temporary ID, the intermediary 100 which has received the print request obtains the access token corresponding to the temporary ID from the temporary-ID management DB. The intermediary 100 transmits, to the cloud service 200, a print request including the access token and the identification information of the document that is to be printed (if both of the cloud service 200 and the intermediary 100 have identified the user in this session through the presentation of the access token in (11) described above, it is unnecessary to transmit the access token again).

In (15), the cloud service 200 which has received the print request returns, to the intermediary 100, print data of the document that is to be printed and that is specified in the request (when necessary, after using the access token or the like included in the request to check validity of the apparatus that has transmitted the request).

In (16), the intermediary 100 transmits the print data received from the cloud service 200, as a response to the multi-function device 400 which has transmitted the print request. The multi-function device 400 prints the print data received from the intermediary 100 on a sheet.

After that, the user inputs the temporary ID to not only the multi-function device 400 but also other various apparatuses which may access to the intermediary 100 until the expiration date of the obtained temporary ID, whereby the user may obtain a service provided by the cloud service 200, via the intermediary 100 from the apparatuses. For example, when a document obtained through scanning is to be registered in a cloud service 200, the user sets a paper document on an automatic document feeder of the multi-function device 400, specifies a folder to which the scan data is to be stored, on the document list obtained in (12), and transmits a scan instruction. Then, the multi-function device 400 scans the document, and transmits, to the intermediary 100, a storage request including the resulting scan data, the temporary ID, and information for specifying a storage destination. The intermediary 100 obtains an access token corresponding to the temporary ID included in the received storage request, and transmits, to the cloud service 200, a storage request including the access token, the scan data, and the information for specifying the storage destination. The cloud service 200 verifies the access token included in the storage request. If it is valid, the cloud service 200 stores the scan data included in the storage request in the specified storage destination.

The flow described above is merely an example.

For example, when an apparatus such as the multi-function device 400 and the user terminal 300 are provided with a near field communication (NFC) function, instead of inputting the temporary ID manually, the temporary ID may be transmitted from the user terminal 300 to the apparatus such as the multi-function device 400 through NFC.

In the procedure in FIGS. 2 and 3, in response to the access request (1) from the user, after obtaining an access token from the cloud service 200, the intermediary 100 provides a temporary ID to the user. The timing at which the temporary ID is provided is not limited to this. FIG. 5 illustrates an example in which the temporary ID is provided at another timing.

In (1), in the example in FIG. 5, similarly to the example in FIG. 2, the user first operates the user terminal 300 and transmits a temporary use request to the intermediary 100.

In (2), the intermediary 100 which has received the request generates a temporary ID.

In (3), the intermediary 100 returns the generated temporary ID to the user terminal 300. For example, when the communication between the user terminal 300 and the intermediary 100 is performed by using Web technology, the intermediary 100 may provide the temporary ID as a cookie to the user terminal 300.

In (4), the user terminal 300 stores the received temporary ID.

In (5), after obtaining the temporary ID, the user selects a cloud service 200 that is to be used, on a menu screen provided by the intermediary 100, and transmits an instruction to access the cloud service 200. Then, the user terminal 300 transmits, to the intermediary 100, an access request including identification information of the selected cloud service 200 and the temporary ID.

In (6) to (10), the intermediary 100 verifies whether or not the temporary ID included in the access request is a valid ID which has been issued by the intermediary 100. If the temporary ID is valid, the intermediary 100 performs a process for obtaining an access token by using an authorization protocol such as OAuth. After that, the processes from acquisition of an access token from the cloud service 200 to management of the access token in association with the temporary ID which has been issued are similar to those in (3) to (7) in the procedure in FIG. 2.

In the example in FIG. 5, after (10), the user terminal 300 presents the temporary ID stored in the form of a cookie or the like, and accesses the intermediary 100, whereby a service of the cloud service 200 may be used via the intermediary 100. Alternatively, the temporary ID may be transmitted to another apparatus (for example, the multi-function device 400) by using a communication method such as NFC, and the cloud service 200 may be used from the apparatus via the intermediary 100. The flow after (10) in which the cloud service 200 is used by using the temporary ID may be similar to that illustrated in FIG. 3.

When the user wants to use another cloud service 200 before the expiration date of the temporary ID, for example, the user transmits a service list request including the temporary ID, from the user terminal 300 to the intermediary 100. When the user selects a service which the user wants to use, in the service list returned from the intermediary 100 in response to the request, the intermediary 100 obtains an access token according to the procedure from (6) to (10) described above from the selected cloud service 200. The intermediary 100 registers the access token in association with the temporary ID in the temporary-ID management DB. After that, when use of the cloud service 200 using the temporary ID is requested, the access token is used to use information which is related to the user and which is stored in the cloud service 200. The same is true for the exemplary embodiment illustrated in FIGS. 2 and 3.

No specific limitations are present for the process performed in the case where the intermediary 100 receives a request from a user who has an account in the intermediary 100. In this case, the intermediary 100 may perform, for example, a process similar to that described in Japanese Unexamined Patent Application Publication No. 2014-10769.

In the description above, as the cloud service 200, a service in which document data is stored, or a service in which document data is converted into print data which is provided to a print apparatus such as the multi-function device 400 is described. The mechanism of the exemplary embodiment may be applied to a cloud service 200 providing any service.

The intermediary 100 described above is achieved by causing a computer to execute programs that describe the above-described functions of the intermediary. The computer has, for example, as hardware, a circuit configuration in which a microprocessor such as a central processing unit (CPU), memories (primary memories), such as a random access memory (RAM) and a read-only memory (ROM), a controller for controlling a fixed storage device, such as a hard disk drive (HDD) or a solid state drive (SSD), various input/output (I/O) interfaces, a network interface that controls connection with a network such as a local area network, and the like are connected with each other via, for example, a bus. In addition, a disk drive for reading and/or writing from/to a portable disk storage medium, such as a compact disk (CD) or a digital versatile disk (DVD), a memory reader/writer for reading and/or writing from/to a portable nonvolatile storage medium according to various standards, such as a flash memory, and the like may be connected to the bus via, for example, the I/O interfaces. Programs describing the processes of the exemplary functional modules described above are stored in a fixed storage device such as a hard disk drive via a storage medium, such as a CD or a DVD, or via a communication unit such as a network, and are installed in a computer. The programs stored in the fixed storage device are read out into the RAM and executed by the microprocessor such as a CPU, thereby achieving the exemplary functional modules described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process comprising:
    receiving a temporary use request from a user;
    generating temporary identification information in accordance with the temporary use request and providing the generated temporary identification information to the user;
    acquiring authorization information from a service providing apparatus only after the temporary identification information is generated, the authorization information being information for receiving delegation of a privilege of the user for the service providing apparatus;
    storing the temporary identification information and the authorization information in association with each other; and
    when an access request including the temporary identification information is received from an apparatus that has transmitted the access request, the access request including an identification of a specific service from the service providing apparatus,
        (i) specifying the authorization information stored in association with the temporary identification information, and
        (ii) transmitting the specified authorization information to the service providing apparatus in order to perform the specific service according to the access request.

2. The non-transitory computer readable medium according to claim 1, wherein
    when the access request including the temporary identification information is received from the apparatus, the temporary identification information is checked for validity, and
    the specified authorization information is transmitted to the service providing apparatus if the temporary identification information is valid.

3. An information processing apparatus comprising:
    a processor programmed to
        receive a temporary use request from a user;
        generate temporary identification information in accordance with the temporary use request and provide the generated temporary identification information to the user;
        acquire authorization information from a service providing apparatus only after the temporary identification information is generated, the authorization information being information for receiving delegation of a privilege of the user for the service providing apparatus; and
    a memory that stores the temporary identification information and the authorization information in association with each other, wherein when an access request including the temporary identification information is received from an apparatus that has transmitted the access request, the access request including an identification of a specific service from the service providing apparatus, the processor is further programmed to
  (i) specify the authorization information stored in association with the temporary identification information, and
  (ii) transmit the specified authorization information to the service providing apparatus in order to perform the specific service according to the access request.

4. The information processing apparatus according to claim 3, wherein
  when the access request including the temporary identification information is received from the apparatus, the temporary identification information is checked for validity, and
  the specified authorization information is transmitted to the service providing apparatus if the temporary identification information is valid.

5. An information processing method comprising:
  receiving a temporary use request from a user;
  generating temporary identification information in accordance with the temporary use request and providing the generated temporary identification information to the user;
  acquiring authorization information from a service providing apparatus only after the temporary identification information is generated, the authorization information being information for receiving delegation of a privilege of the user for the service providing apparatus;
  storing the temporary identification information and the authorization information in association with each other; and
  when an access request including the temporary identification information is received from an apparatus that has transmitted the access request, the access request including an identification of a specific service from the service providing apparatus,
    (i) specifying the authorization information stored in association with the temporary identification information, and
    (ii) transmitting the specified authorization information to the service providing apparatus in order to perform the specific service according to the access request.

6. The information processing method according to claim 5, wherein
  when the access request including the temporary identification information is received from the apparatus, the temporary identification information is checked for validity, and
  the specified authorization information is transmitted to the service providing apparatus if the temporary identification information is valid.

* * * * *